3,470,196
// PREPARATION OF V-TRIAZOLES
George R. Harvey, Kirkwood, Mo., assignor to Monsanto Company, St. Louis, Mo., a corporation of Delaware
No Drawing. Filed Nov. 12, 1965, Ser. No. 507,516
Int. Cl. C07d *55/02;* A01n *9/22*
U.S. Cl. 260—308
10 Claims This invention relates to a novel method of preparing 1,2,3-triazoles and particularly the triazoles of the formula

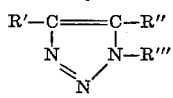

wherein R' is selected from the class consisting of alkyl having up to four carbon atoms, chlorine, bromine and hydrogen; wherein R" is selected from the class consisting of alkyl having up to 12 carbon atoms, phenyl, nitrophenyl, bromophenyl and chlorophenyl; wherein R''' is selected from the aromatic radicals of the class consisting of phenyl, benzenesulfonyl, benzoyl and the said aromatic radicals containing substituents selected from the class consisting of alkyl of up to four carbon atoms, chlorine, bromine and nitro.

The compounds produced by the novel reaction have phytotoxic properties and are useful in inhibiting the growth of undesired vegetation.

The novel procedure involves the chemical reaction

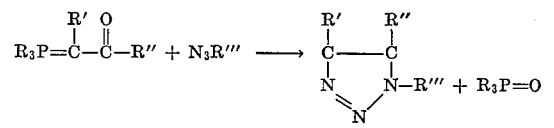

wherein R is selected from the class consisting of phenyl and alkyl of up to 12 carbon atoms; and wherein R', R" and R''' are as above defined.

The reaction is conducted in an inert solvent medium, preferably a chlorinated hydrocarbon, such as methylene chloride, chloroform, carbon tetrachloride, dichloroethane, propylene chloride, 1,2-dichloropropane and the like. By the preferred procedure the phosphorane and the azide are each dissolved in a chlorinated hydrocarbon solvent, preferably the same solvent and the dissolved reactants mixed under appropriate conditions.

The temperature required to effect the reaction depends to some extent on the selection of the R" substituent of the phosphorane and on the R''' of the azide. Phosphoranes with R"=methyl are more reactive than the aromatic substituted phosphoranes. Toluene sulfonyl azide reacts much faster than benzoyl azide and phenyl azide, whereas the aliphatic azides have little or no reactivity with the phosphoranes. The more reactive reagents require no heating and the reaction can be initiated by combining the reactant solutions at or below room temperature. With the less active reagents the reactions require moderate heating to effect the reaction in a reasonable period of time. Reaction of phenyl azide with a phosphorane requires higher temperatures, for example up to reflux temperature and longer reaction periods. The optimum temperature may differ with the nature of the reactants but can be readily ascertained.

Further details of the novel process are set forth with respect to the following examples.

Example 1

Equimolar proportions of acetylmethylenetriphenylphosphorane and p-toluenesulfonyl azide were each dissolved in methylene chloride and the solutions mixed at room temperature. The reaction was completed in 15 minutes. A 98% yield of 1-p-toluenesulfonyl-5-methyl-1,2,3-triazole was recovered and recrystallized from aqueous alcohol solution (M.P. 119.5 to 121° C.).

Example 2

A mole of benzoylmethylenetriphenylphosphorane was dissolved in 30 ml. of ethylene dichloride and added at room temperature to a molar proportion of p-toluenesulfonyl azide also in ethylene dichloride solution. In one hour the reaction was complete and a 98 percent yield of 1-p-toluenesulfonyl-5-phenyl-1,2,3-triazole was recovered. Upon recrystallization from an aqueous alcohol solution a crystalline product (M.P. 114–118° C.) was obtained.

Example 3

A chloroform solution of p-nitrobenzoylmethylenetriphenylphosphorane was mixed at room temperature with an equimolar proportion of p-toluenesulfonyl azide also in chloroform solution. After 10 hours an 87 percent yield of product was formed which was recrystallized from ethyl acetate solution. The product (M.P. 172–173° C.) was identified as 1-(p-toluenesulfonyl)-5-(p-nitrophenyl)-1,2,3-triazole.

Example 4

A methylene chloride solution of one gram mole of benzoylmethylenetriphenylphosphorane was mixed at room temperature with a molar proportion of 3,4-dichlorobenzoyl azide. The product formed in 97 percent yield after 18 hours was recrystallized from a mixture of chloroform and hexane and identified as 1-(3,4-dichlorobenzoyl)-5-phenyl-1,2,3-triazole (M.P. 134–135° C.).

Example 5

One tenth of a gram mole of p-bromobenzoylmethylenetriphenylphosphorane was dissolved at room temperature in 1,2-dichloroethane with a molar proportion of p-toluenesulfonyl azide. After 5 hours an 80 percent yield of crystalline product was obtained. The product, which melted with some decomposition at 139.5° C., was identified as 1 - (p-toluenesulfonyl)-5-(p-bromophenyl)-1,2,3-triazole.

Example 6

Equimolar proportions of acetylmethylenetriphenylphosphorane and phenyl azide were heated for 80 hours at reflux temperature in methylene chloride. A solid crystalline product (M.P. 61–62° C.) was recovered in a 24 percent yield and identified as 1-(phenyl)-5-methyl-1,2,3-triazole.

Example 7

Using the procedure of Example 1 except that p-nitrobenzoylchloromethylene-tritri-n-butylphosphorane was reacted with benzenesulfonyl azide, the resulting product was identified as 1-(benzenesulfonyl)-4-chloro-5-(p-nitrophenyl)-1,2,3-triazole.

Example 8

By the procedure of Example 1, p-bromobenzoylbromomethylenetriphenylphosphorane was reacted with p-bromophenyl azide to form a compound of the formula

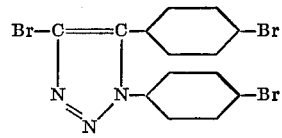

Example 9

The procedure of Example 1 was repeated except that the reactants were p-nitrophenyl azide and propionylethylidenetriphenyl-phosphorane. The resulting product was found to be 1-(p-nitrophenyl)-4-methyl-5-ethyl-1,2,3-triazole.

Example 10

1-(p-chlorophenyl)-5-(p-bromophenyl)-1,2,3-triazole-phosphorant was prepared by reacting p-bromobenzoyl-methylenetri-n-butylphosphorane with p-chlorophenyl azide by the procedure of Example 1.

Although the invention is described above with respect to specific modifications, it is not intended that the details thereof are to be construed as limitations on the scope of the invention.

The embodiments of the invention in which an exclusive property or privilege is claimed are defined as follows:

1. The method of preparing triazoles of the formula

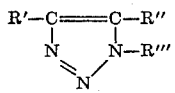

wherein R' is selected from the class consisting of alkyl having up to four carbon atoms, chlorine, bromine and hydrogen; wherein R'' is selected from the class consisting of alkyl having up to 12 carbon atoms, phenyl, nitrophenyl, chlorophenyl, bromophenyl; and wherein R''' is selected from the class of aryl moieties consisting of phenyl, benzenesulfonyl, benzoyl and the said aryl moieties containing substituents of the class consisting of alkyl of up to four carbon atoms, chlorine, bromine and nitro, which comprises reacting, in an inert solvent, a phosphorane of the formula

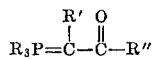

wherein R is selected from the class consisting of phenyl and alkyl of up to 12 carbon atoms with an azide of the formula $R'''N_3$.

2. The method of claim 1 wherein R is phenyl.
3. The method of preparing triazoles of the formula

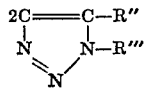

wherein R'' is selected from the group consisting of alkyl, having a maximum of 12 carbon atoms, phenyl, nitrophenyl, chlorophenyl and bromophenyl and R''' is selected from the group consisting of aryl moieties consisting of phenyl, benzenesulfonyl, benzoyl and said aryl moieties containing substituents selected from the group consisting of alkyl having a maximum of four carbon atoms, chlorine, bromine and nitro, which comprises reacting in an inert solvent medium a phosphorane of the formula

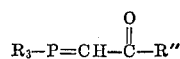

wherein R is selected from the group consisting of phenyl and alkyl having a maximum of 12 carbon atoms with an azide having the formula $R'''N_3$.

4. The method of claim 1 wherein the reaction is condducted in a hydrocarbon medium.
5. The method of claim 3 wherein R is phenyl, R' is hydrogen, R'' is phenyl and R''' is toluenesulfonyl.
6. The method of claim 3 wherein R is phenyl, R' is hydrogen, R'' is methyl and R''' is benzenesulfonyl.
7. The method of claim 3 wherein R is phenyl, R' is hydrogen, R'' is phenyl and R''' is benzenesulfonyl.
8. The method of claim 3 wherein R is phenyl, R' is hydrogen, R'' is methyl and R''' is toluenesulfonyl.
9. The method of claim 3 wherein R is phenyl, R' is hydrogen, R'' is p-chlorophenyl and R''' is toluenesulfonyl.
10. The method of claim 3 wherein R is phenyl, R' is hydrogen, R'' is p-chlorophenyl and R''' is benzenesulfonyl.

References Cited

Elderfield: Heterocyclic Compounds, vol. 7, 1961, pp. 387–8.

Gough et al.: Proc. Chem. Soc., London, 1961, p. 302.

ALEX MAZEL, Primary Examiner

R. J. GALLAGHER, Assistant Examiner

U.S. Cl. X.R.

71—92